United States Patent

[11] 3,628,145

| | | |
|---|---|---|
| [72] | Inventors | Gunnar Axel Kihlberg<br>Sollentuna;<br>Karl Erik Bystrom, Bromma, both of Sweden |
| [21] | Appl. No. | 854,928 |
| [22] | Filed | Sept. 3, 1969 |
| [45] | Patented | Dec. 14, 1971 |
| [73] | Assignee | Jungner Instrument Aktiebolag<br>Stockholm, Sweden |
| [32] | Priority | Sept. 13, 1968 |
| [33] | | Sweden |
| [31] | | 12380/68 |

[54] INDUCTIVE APPARATUS FOR INDICATING MECHANICAL POSITIONS AND/OR MEASURING LINEAR POSITIONAL CHANGES
1 Claim, 5 Drawing Figs.

[52] U.S. Cl. .................................. 324/34 D,
318/653, 340/195
[51] Int. Cl. .................................. G01r 33/00
[50] Field of Search .......................... 324/34 P,
34 D; 340/195, 199; 336/130–135; 318/653,
656–658

[56] References Cited
UNITED STATES PATENTS
2,905,874  9/1959  Kelling ................ 324/34 PS
FOREIGN PATENTS
221,365  7/1968  Sweden ................ 324/34 DP Primary Examiner—Rudolph V. Rolinec
Assistant Examiner—R. J. Corcoran
Attorney—Fred C. Philpitt ABSTRACT: The invention relates to an improved inductive transmitter for indicating and measuring linear position changes comprising at least two iron cores each with primary and secondary windings cooperating with an armature of magnetic material, the cores or armature being movable in relation to the transmitter. Both the iron cores and the armature are provided with spaced teeth which are confronting each other so that the magnetic coupling between the windings of the cores will change when the relative position of the armature to the cores is changed. The essential feature of the invention is that the armature teeth cooperating with one core are displaced relative to the armature teeth cooperating with the other core. This provides an improved symmetrical function of the magnetic coupling in each transmitter and the invention also includes some specific embodiments of this arrangement. In one embodiment two iron cores are spaced with their toothed surfaces facing each other thereby forming an airgap in which an armature is disposed. The armature could be in the form of a corrugated strip so that the armature teeth cooperating with one iron core will form the slots cooperating with the other iron core which means that the teeth cooperating with the two iron cores will be exactly 180 degrees displaced in relation to each other.

3,628,145

INDUCTIVE APPARATUS FOR INDICATING MECHANICAL POSITIONS AND/OR MEASURING LINEAR POSITIONAL CHANGES

INDUCTIVE TRANSMITTER

The present invention relates to an inductive transmitter for indicating and measuring linear position changes comprising iron cores with primary and secondary windings, said primary windings being connected to an AC voltage source and said cores having substantially rectangular cross sections and being provided with a grooved surface with spaced teeth, an armature of magnetic material provided with spaced teeth confronting the core-teeth, the cores and armature being movable in relation to each other, whereby the magnetic coupling between the windings of the core will change when the relative position of the armature to the core is changed.

U.S. Pat. No. 3,505,865 (U.S. Pat. application No. 623,444 filed Mar. 15, 1967) discloses a system for measuring angular differences between two mechanical elements, such as toothed wheels, including a transmitter means, such as an inductive transmitter, operatively coupled to each of the mechanical elements and adapted to produce a voltage vector which varies 360 electrical degrees for each pitch of a tooth of the toothed wheel, and a comparison unit adapted to receive the voltage vectors and supply an indication of the angular difference between the mechanical elements, such as an output voltage directly proportional to the difference in phase angle between the voltage vectors.

An inductive transmitter may, as disclosed in the above patent, comprise a core with substantially rectangular cross section and with a grooved surface with spaced teeth. An armature of magnetic material is displaceable in parallel with the grooved surface of the core and is also provided with spaced teeth confronting the teeth of the core. The transmitter comprises means for generating a voltage vector the angular position of which depends on the position of the armature. The tooth pitch of the core and the armature is chosen that the displacement of the armature one tooth pitch will cause an angular variation from 0 to 360°. According to the cited specification each transmitter is formed by one core and it has appeared that one single transmitter element provides relatively bad symmetry.

The main object of the present invention is to provide an improved symmetrical function of the magnetical coupling in each transmitter.

Another object is to provide a transmitter in which optimal symmetrical function is achieved and very small space is required.

A further object is to provide an arrangement capable of measuring displacements of a rate greater than that corresponding to one tooth pitch.

These objects are realized in the present invention substantially by the fact that the transmitter comprises at least two substantially identical iron cores with the armature teeth cooperating with one core displaced relative to the armature teeth cooperating with the other core, the primary or secondary windings of the iron cores being connected to a phase shift network operative to combine the voltages induced in each of the secondary windings of the iron cores to a voltage vector, the angular position of which is determined by the position of the armature cooperating with the respective iron core, the angle of said voltage vector varying from 0° to 360° when the armature is displaced one tooth pitch.

Some preferred embodiments of the present invention will now be described by way of examples reference being made to the accompanying drawings in which.

The iron core 1 contained in the transmitter according to the invention is comprised by a laminated plate bundle with substantially rectangular cross section which is provided with teeth 2 and slots 3 for the transmitter windings facing an armature 4. The tooth pitch of the iron core and of the armature 4 have a certain integer ratio in relation to each other and the teeth have to be thus formed that the amplitudes of the secondary voltages induced in the secondary windings of the transmitter will vary sinusoidally and in relation to the position of the armature. The tooth pitches in the core and the armature are chosen to accomplish an angular variation of 360° of the voltage vector when the armature is displaced one tooth pitch.

Figure 1:
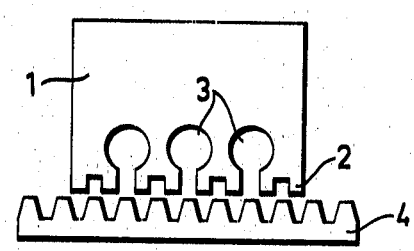
FIG. 1 is a sectional view of one of the two iron cores contained in the transmitter.
Figure 2:
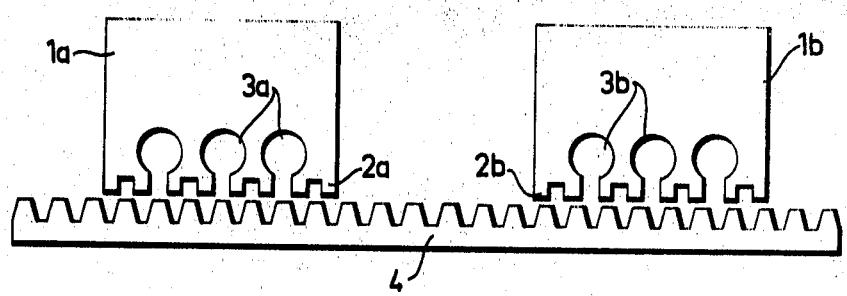
FIG. 2 is a sectional view of the two iron cores being disposed side by side and having a certain displacement within the tooth pitch of the armature.

In FIG. 2 two iron cores 1a and 1b are arranged side by side and cooperate with one armature 4, which is provided with teeth. One core cooperates with armature teeth which are displaced 180° relative to the armature teeth cooperating with the other core.

Figure 3:
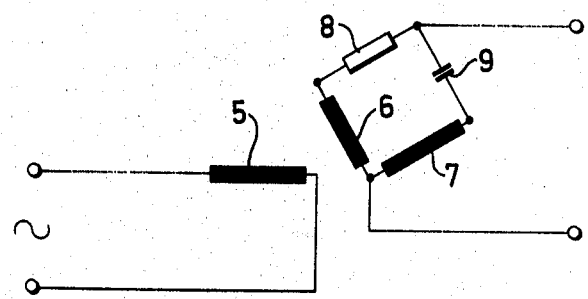
FIGS. 3 and 4 are electrical diagrams showing two different embodiments of the transmitter.

The transmitter shown in FIG. 3 could for instance include cores as shown in FIG. 2. The transmitter windings comprise a primary winding 5, which is connected to an AC voltage source and two secondary windings 6 and 7 in which two AC voltages are induced with a phase difference in space of 90° and equal time phase shift. These voltages are supplied to a resistor 8 and a capacitor 9 forming a phase shift network, which combines these secondary voltages to a voltage vector, the angular position of which corresponds to the displacement of the armature in relation to the iron core.

Figure 4:
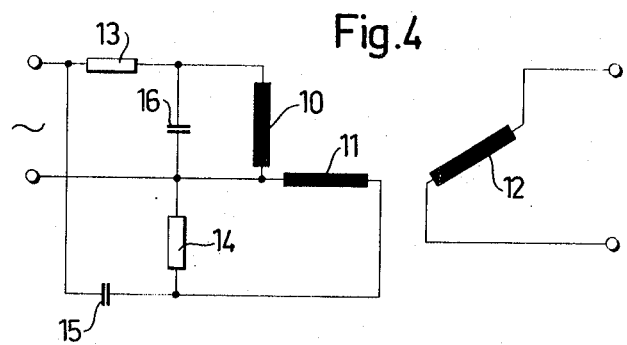
Figure 5:
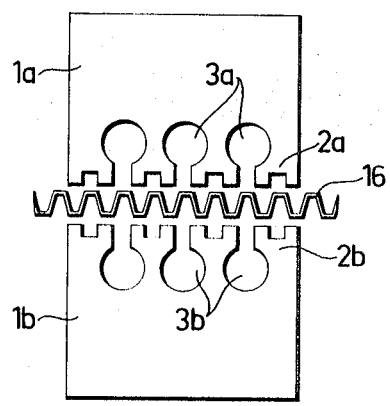
FIG. 5 is a preferred embodiment of the invention in which two identical iron cores are arranged straight opposite each other on both sides of an armature.

A voltage vector of the kind mentioned above could be obtained by means of a transmitter in which the phase shift network is connected before the windings of the transmitter. FIG. 4 shows an embodiment of such a transmitter having one secondary winding 12 and two primary windings 10 and 11 which have a phase difference in space of 90°. The supply voltage to the primary windings passes at first the phase shift network comprising two resistors 13, 14 and two capacitors 15, 16 which are thus arranged that the voltages across the primary windings will have a phase difference of 90°.

In a preferred embodiment of the invention the transmitter includes two identical iron cores 1a and 1b, which are symmetrically placed with the toothed surface facing each other with a certain airgap, in which an armature suitably constituted by a corrugated ribbon 16 is arranged in parallel with the teeth surfaces of the cores. This achieves good symmetry of the magnetic coupling in each core since the armature teeth cooperating with the first iron core 1a is exactly 180° displaced in relation to the armature teeth cooperating with the second iron core 1b. Moreover, the tooth pitch could easily be adjusted by stretching or compressing the ribbon 16.

What we claim is:

1. In an inductive apparatus for indicating mechanical positions and/or measuring linear positional changes, comprising two transmitter means, each including primary and secondary windings operatively coupled to an alternating current voltage source and a magnetic core with substantially rectangular cross section, said cores being provided with teeth to form slots for said primary and secondary windings, an armature of magnetic material, which is also provided with spaced teeth facing the teeth of said cores, said armature being displaceable in relation to said transmitters in order to change, upon displacement, the magnetic coupling between the primary and secondary windings of said cores, the improvement wherein armature teeth cooperating with one transmitter core are displaced 180° in relation to armature teeth cooperating with the other transmitter core, each of said transmitters being adapted to produce an alternating current voltage vector of the type:

$$\bar{U} = k_1 \hat{U} \sin(wt. + \beta)$$

wherein $\beta$ is the angular position of the armature in relation to said one transmitter core and varies from 0° to 360° when the armature is displaced one tooth pitch, said two cores being positioned in spaced relationship with their slotted surfaces facing each other so that each core forms the mirror image of the other core, said armature being formed as a corrugated strip, which is disposed in the interspace between said cores, whereby the armature teeth cooperating with one of said transmitter cores, will be exactly 180° displaced in relation to the armature teeth cooperating with the other transmitter core.

* * * * *